United States Patent
Poilasne et al.

(10) Patent No.: US 7,640,040 B2
(45) Date of Patent: Dec. 29, 2009

(54) SYSTEMS AND METHODS FOR TUNING AN ANTENNA CONFIGURATION IN A MOBILE COMMUNICATION DEVICE

(75) Inventors: Gregory Poilasne, San Diego, CA (US); Richard J. Camarillo, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 326 days.

(21) Appl. No.: 11/209,023

(22) Filed: Aug. 22, 2005

(65) Prior Publication Data

US 2007/0042725 A1 Feb. 22, 2007

(51) Int. Cl.
*H04M 1/00* (2006.01)

(52) U.S. Cl. ............... 455/562.1; 455/10; 455/65; 455/67.13; 455/418; 455/419; 455/420; 455/501; 455/504; 455/505; 455/506; 370/241; 370/242; 370/241.1; 370/310.2

(58) Field of Classification Search ............ 455/10, 455/65, 67.13, 418–420, 501, 504–506; 370/241–242, 310.2

See application file for complete search history.

(56) References Cited

U.S. PATENT DOCUMENTS

| | | | |
|---|---|---|---|
| 4,578,819 A * | 3/1986 | Shimizu | 455/135 |
| 5,081,463 A | 1/1992 | Hariu et al. | |
| 5,457,467 A | 10/1995 | Schenkyr et al. | |
| 5,809,020 A * | 9/1998 | Bruckert et al. | 370/335 |
| 5,835,855 A * | 11/1998 | Burns | 455/277.1 |
| 5,920,809 A * | 7/1999 | Clarke | 455/272 |
| 5,926,503 A * | 7/1999 | Kelton et al. | 375/148 |
| 5,991,331 A * | 11/1999 | Chennakeshu et al. | 375/136 |
| 5,999,138 A * | 12/1999 | Ponce de Leon | 343/745 |
| 6,044,254 A | 3/2000 | Ohta et al. | |
| 6,085,104 A * | 7/2000 | Kowalski et al. | 455/506 |
| 6,125,109 A * | 9/2000 | Fuerter | 370/315 |
| 6,208,632 B1 * | 3/2001 | Kowalski et al. | 370/335 |
| 6,229,489 B1 * | 5/2001 | Holshouser et al. | 343/702 |
| 6,229,840 B1 * | 5/2001 | Ichihara | 375/147 |
| 6,314,130 B1 * | 11/2001 | Smolyar et al. | 375/150 |
| 6,336,036 B1 * | 1/2002 | Hayes | 455/550.1 |
| 6,373,832 B1 * | 4/2002 | Huang et al. | 370/342 |
| 6,400,336 B1 * | 6/2002 | Gleener | 343/860 |
| 6,584,091 B2 * | 6/2003 | Lomp et al. | 370/342 |
| 6,625,202 B1 | 9/2003 | Sudo et al. | |
| 6,628,969 B1 | 9/2003 | Rilling | |

(Continued)

FOREIGN PATENT DOCUMENTS

JP 1995-107024 A 4/1995

(Continued)

OTHER PUBLICATIONS

Matsuyama, Koji, "Diversity Circuit", Abstract, JP07107024A, www.aurekaontap.com, p. 1 of 1.

*Primary Examiner*—Stephen M D'Agosta (57) ABSTRACT

A mobile communication device comprises a plurality of spatially and/or polar diverse antenna configurations. Signals received by each of the plurality of antenna configurations are combined in a combiner and passed to a rake receiver that can be configured to combine the signals received by each of the plurality of antenna configurations for further processing. The mobile communication device can comprises a signal adjusting network that can be configured to adjust the phase and/or magnitude of signals being received by one of the antennas.

6 Claims, 5 Drawing Sheets

U.S. PATENT DOCUMENTS

| | | |
|---|---|---|
| 6,710,651 B2 | 3/2004 | Forrester |
| 6,725,057 B1 * | 4/2004 | Boyle ...................... 455/550.1 |
| 6,799,026 B1 * | 9/2004 | Scherzer et al. .......... 455/279.1 |
| 6,799,059 B1 * | 9/2004 | Austin et al. ................ 455/561 |
| 6,924,766 B2 | 8/2005 | Tran |
| 7,058,361 B2 * | 6/2006 | Park et al. .................. 455/63.1 |
| 7,292,622 B2 * | 11/2007 | McCorkle .................. 375/148 |
| 2001/0034208 A1 * | 10/2001 | Kline et al. ................. 455/67.1 |
| 2001/0039198 A1 * | 11/2001 | Onishi et al. ................ 455/562 |
| 2004/0028121 A1 * | 2/2004 | Fitton ........................ 375/144 |

FOREIGN PATENT DOCUMENTS

WO     WO 01/71940 A2    9/2001

* cited by examiner

SYSTEMS AND METHODS FOR TUNING AN ANTENNA CONFIGURATION IN A MOBILE COMMUNICATION DEVICE

FIELD OF THE INVENTION

The present invention relates generally to mobile communication devices, and more particularly to selecting antenna configurations in a mobile communication device.

BACKGROUND OF THE INVENTION

Users of mobile communication devices, such as cellular telephones, Personal Digital Assistants (PDAs) or laptop computers that include wireless capability, etc., often experience performance problems, such as dropped calls, poor call quality, and an inability to connect with the network. Such problems are often the result of interference from other wireless signals in the area. Additionally, however, such problems can also be the result of what is called multi-path interference.

The term multi-path is a term that describes how a signal transmitted in a wireless environment travels along multiple paths from the transmission source to the destination or receiver. For example, when a base station transmits a signal to a mobile communication device, the energy comprising the signal spreads out. Some of the energy can travel along a direct line to the mobile communication device. This direct line is one path. Some of the energy can, e.g., reflect off a building and then reach the mobile communication device. The reflected signal path being a second path. Similarly, some of the energy can reflect off other buildings, or mountains, etc., before reaching the mobile communication device. The different paths traveled by the signal energy from the base station to the mobile device are referred to as multi-paths, and the associated signal energies are referred to as the multi-path signals, or sometimes multi-path for short.

The multi-path signals combine with each other in the mobile communication device receiver. At times the multi-path signals will combine constructively, but at other times the signals will combine destructively, i.e., the signals will combine in such a manner that they at least partially cancel each other out, or interfere with each other. This is because the multi-path signals can be out of phase with each other due to the different lengths of the paths traveled. Destructive multi-path combining, or interference, can lower the signal-to-noise ratio in the receiver, and affect other signal parameters, causing the problems referred to above. Such destructive multi-path interference is often referred to as fading, i.e., it causes the signal as seen by the mobile communication device receiver to fade out.

Another source of interference in communication systems is jamming transmissions. These transmissions, or the source of these transmissions, can also be referred to as jammers. Jamming is sometimes defined as deliberate interference in communications by means of unwanted signals that are intended to render unintelligible or to falsify the whole or part of the desired signal. As used herein, however, jamming can include interference that is not intentional, for example transmissions from other mobile communication devices.

Spatial diversity has been used to combat the problem of destructive multi-path interference, fading, jamming, etc. In its simplest form, spatial diversity comprises two antennas spaced a certain distance apart. Often, the distance between the antennas is related to the wavelength of the signal being received, e.g., a half wave length or quarter wavelength of separation. The idea of spatial diversity is that if one antenna at one location is experiencing, e.g., fading due to the destructive combining of multi-path signals, then it is likely that the other antenna will not be experiencing fading. When the first antenna is experiencing fading, the second antenna can be selected. Thus, spatial diversity can improve performance and help overcome, e.g., the problems referred to above. Moreover, spatial diversity can extend to any number of antennas.

Stated another way, the signal received by the second antenna is uncorrelated with the signal received by the first. If the antennas were receiving the same signal, then the signals produced by the antennas would be highly correlated. Obviously, having two antennas receiving highly correlated signals is not necessarily helpful, since problems with the received signal for open of the antennas will also be experienced by the other antenna. Thus, an aim of including spatial diversity is to add uncorrelated signals that can be used to improve receiver performance.

Polar diversity can also be implemented in order to improve performance in a mobile communication device. It will be understood that the polarity, or polarization of an antenna affects how the antenna receives signals. Thus, an antenna that has a different polarity relative to another antenna can provide uncorrelated signals relative to the other antenna even if the antennas are co-located.

Antennas can have different radiation patterns as well, which will affect how the antenna sends and receives signals. Diversity with respect to the radiation pattern of two antennas can also provide uncorrelated signals that can be used to improve reception.

Another form of diversity that is commonly used in conventional mobile communication devices is time diversity. For example, many conventional mobile communication devices include a rake receiver that can differentiate different multi-paths. The rake receiver is actually a combination of sub-receivers delayed with respect to one another.

In certain conventional communication devices, a plurality of spatially and or polar diverse antennas are incorporated into the communication device. The device can then be configured to switch between different antennas and/or different polarities in order to attempt to improve the received signal quality. This type of configuration is referred to as a smart antenna configuration. When the received signal quality in a device with a smart antenna is degraded beyond a certain point, the device can switch between a plurality of antenna configurations in an attempt to improve the received signal quality.

A drawback to such conventional approaches, however, is that only one antenna configuration is used at a given time. As a result, alternate antenna configurations that may be receiving signals with better signal quality that could aid in overall reception will not be used.

SUMMARY OF THE INVENTION

A mobile communication device comprises a plurality of antenna configurations and a signal adjusting network. Signals received by each of the plurality of antenna configurations can be combined in a combiner and passed to a rake receiver. The signal adjusting network can be configured to adjust the phase and/or magnitude of the signals received by one of the plurality of antennas in order to compensate for various types of signal interference.

In one aspect, a primary antenna can be used to receive signals. When it is determined that the primary antenna configuration is experiencing a fade, then a secondary antenna can be coupled to the receiver, e.g., via the signal adjusting network, such that the signals from the secondary receiver can be combined with the signals from the primary receiver in order to improve reception.

In another aspect, a detector can be included in the mobile communication device and configured to detect when a jammer is present. When the detector detects that a jammer is present, the phase and/or magnitude of the signals being received by one or more of the plurality of antennas can be adjusted so as to improve the signal quality.

These and other features, aspects, and embodiments of the invention are described in greater detail below.

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

Figure 1:
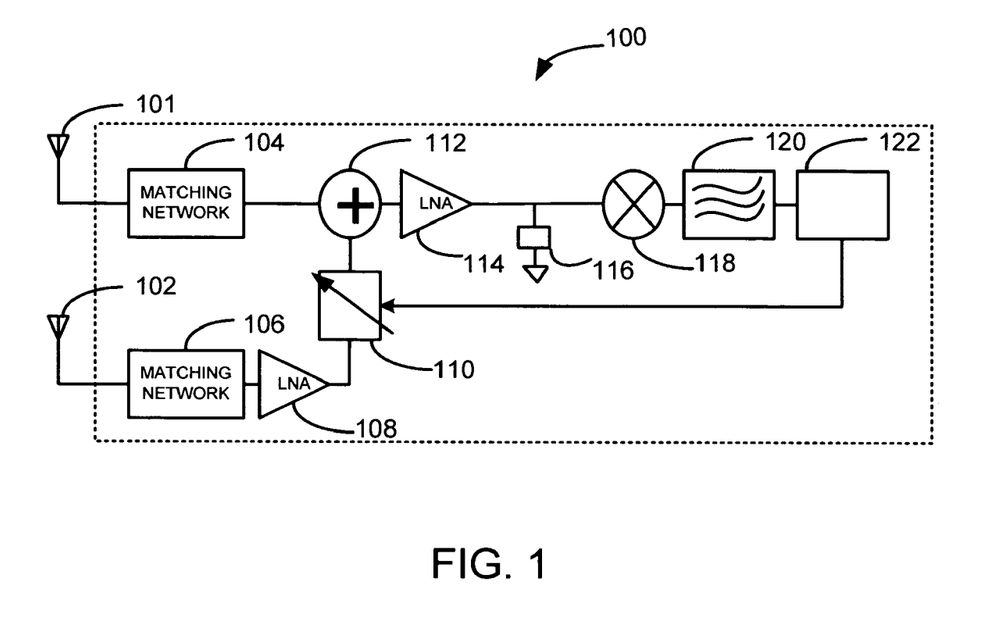
FIG. 1 is a diagram illustrating an example mobile communication device comprising a plurality of antenna configurations in accordance with one embodiment.

FIG. 1 is a diagram illustrating various components comprising a mobile communication device 100. The components include a plurality of antennas, two of which are shown by way of example. These two antennas are antennas 101 and 102. As can be seen, antennas 101 and 102 are spatially diverse, i.e., separated by a distance, with respect to each other. In addition, each of antennas 101 and 102 can have a unique polarity in relation to the other, and/or a unique radiation pattern relative to one another. The combination of position, radiation, pattern, polarity, etc., of antennas 101 and 102 can be referred to as an antenna configuration. Thus, mobile communication device 100 can be said to comprise two antenna configurations. The purpose, as explained below, of including multiple antenna configurations is to enable device 100 to receive signals from multiple antennas that will be uncorrelated with respect to each other, so that the various signals can be used to improve receiver performance. The term "antenna" and "antenna configuration" will be used somewhat interchangeably in the description that follows.

As mentioned above, in conventional mobile communication devices that comprise multiple antenna configurations, antenna configurations can be selected based on a determination of parameters related to the signals being received by one or more of the antenna configurations. In mobile communication device 100, however, the signals received by antennas 101 and 102 can be summed, or combined, by summer 112. The summed signals can then be passed to Low Noise Amplifier (LNA) 114. LNA 114 can be configured to amplify the signals received from antenna 101 and/or antenna 102 without adding any, or at least very little, additional noise at the output of LNA 114. The amplified signals can then be down converted via multiplexer 118.

In certain embodiments, a rake receiver 120 can then receive the down converted combined signals from antennas 101 and 102 and discern various multi-path signals therein. As mentioned a rake receiver is a radio receiver designed to counter the effects of multi-path fading. It does this by using several sub-receivers each delayed slightly with respect to the previous sub-receiver in order to tune to the individual multi-path components. Each component is then decoded independently, but at a later stage combined in order to make the most use of the different transmission characteristics of each transmission path. In other words, each multi-path will be at least some what uncorrelated with other multi-paths do to the time diversity of the signals. The different paths are added in order to improve the ratio of the average power of a channel, typically the pilot channel, to the total signal power (typically denoted "Ec/Io").

Thus, rake receiver 120 can produce at least one path from each of antennas 101 and 102 that will be uncorrelated with each other. The phase of the two signals can then be aligned and the signals can be combined in order to produce a more robust receive signal. The goal is to improve the Signal to Noise Ratio (SNR), and, likewise, Ec/Io for CDMA applications, by using the different transmission characteristics of each transmission path. This is in contrast to conventional mobile communication device receivers, which use multi-paths from a single antenna configuration.

Further, mobile communication device 100 can include a baseband processor 122, such as a Mobile Station Modem (MSM). Baseband processor 122 can be configured to further process the received signals. It will be understood that conventional baseband processors perform many signal processing and control functions; however, not all of these functions will be discussed herein. Some of these functions can include monitoring and/or measuring the SNR for the received signals. For example, baseband processor 122 can be configured to monitor the Ec/Io for the received signals. Baseband processor can be configured to use the information for various purposes including controlling signal adjusting network 110 as described in more detail below. Baseband processor 122 can also be configured to monitor how many "fingers" of rake receiver 120 are filled, i.e., being used as well as the quality of the information in each finger. Baseband processor 122 can also be configured to monitor the received signal quality.

It should be noted that rake receiver 120 can be included in a baseband processor 122. Alternatively, some or all of rake receiver 120 can be external to baseband processor 122.

Antennas 101 or 102 are coupled with the rest of the receive chain via impedance matching networks 104 and 106 respectively. Impedance matching is employed in circuit design for matching unequal source and loading impedances. Impedance matching is required in order to optimize the power delivered to the load from the source, in this case from antennas 101 or 102 to the receive chain. Impedance matching is accomplished by inserting matching networks, such as matching networks 104 and 106, into the circuit between the source and load. A simple example can involve matching unequal source and load resistances with an inductance-capacitance circuit.

Simple series/shunt inductance-capacitance-matching networks are often used in mobile communication devices, such as mobile communication device 100. Such an inductance-capacitance matching network can comprise fixed valued inductive components and capacitors; however, impedance matching using such fixed valued inductive components and capacitors can be difficult to achieve and highly application-specific. Alternatively, a matching network, such as matching networks 104 and 106, can comprise tunable inductive components and capacitors such as ferro-electric capacitors. The value of capacitance or inductance can be much more easily controlled by dynamic impedance matching for a receiver as described in more detailed below.

In addition to matching networks 104 and 106, one or more signal adjusting networks, such as signal adjusting network 110 can be included in mobile communication device 100. Signal adjusting network 110 can be a Resistor-Inductor-Capacitor (RLC) filter network in which, e.g., the capacitive component is adjustable, or tunable. The RLC components can comprise fixed components that can, for example, be switched in and out to adjust the characteristics, e.g., the capacitive characteristics, of the RLC network. Alternatively, these components can comprise Ferroelectric components that can more easily be tuned and that can be made much smaller, reducing cost, board area and complexity.

Signals from antenna 102 can be sent to LNA 108 as illustrated.

It will be clear that other components commonly included in the receive chain are not illustrated in FIG. 1. These components have been left out of the example of FIG. 1 for the sake of brevity; however, this should not be seen as excluding such components from embodiments of the systems and methods described herein. Moreover, it will be clear that various other combinations of components illustrated in FIG. 1 are possible. For example, an LNA can be included between matching network 104 and summer 112. Such an LNA could be in addition to, or in place of LNA 114, depending on the embodiment. A tunable matching network can also be included in device 100. For example, matching networks 104 and/or 106 can be tunable matching networks. Tunable matching networks are described in more detail below.

The inclusion of signal adjusting networks, such as signal adjusting network 110, enables a mobile communication device 100 to improve received performance under a variety of adverse conditions. For example, as mentioned, signals from antenna 101 and 102 can be combined in summer 112 and provided to a rake receiver 120. Rake receiver 120 can then use multi-paths from either antenna 101 and/or antenna 102 in order to generate at least one path for each of antennas 101 and 102. The paths can then be combined such that the signal characteristics from the paths can be used to improve the SNR in the receiver. At the same time, baseband processor 122 can be configured to monitor the SNR, the number of rake fingers being used, the received signal quality, etc. Baseband processor 122 can then be configured to control signal adjusting network 110 so as to further improve the received signal quality.

For example, baseband processor 122 can be configured to control signal adjusting network 110 so as to control the phase and/or magnitude of signals being received via antenna 102 in order to improve, or optimize the receive signal quality. In other words, baseband processor 122 can adjust the phase and/or magnitude of the signals being received via antenna 102 in order to improve SNR, fill more fingers of rake receiver 120, or otherwise improve the received signal quality. Thus, if baseband detector 122 detects that there is room to improve the received signal quality, it can control signal adjusting network 110 in order to adjust the phase and/or magnitude of signals being received via antenna 102 in order to increase the signal strength, reduce the noise, or both.

Figure 2:
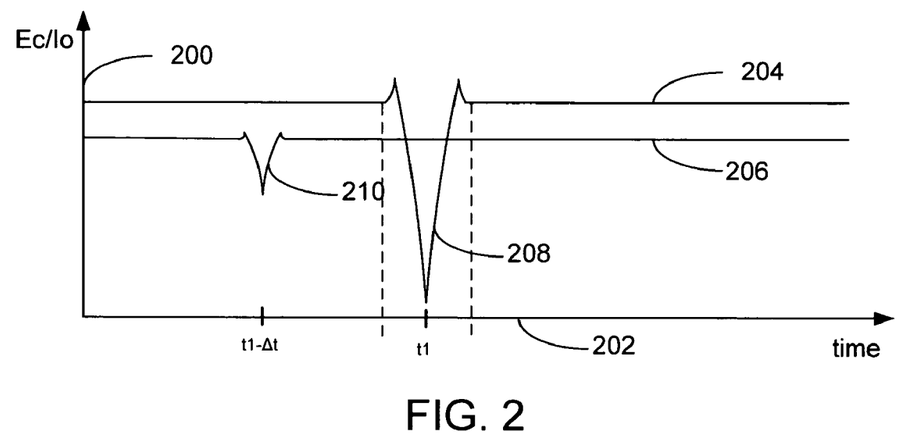
FIG. 2 is a diagram illustrating graphs of the signal strength for signals received using the antennas included in the mobile communication device of FIG. 1.
Figure 3:
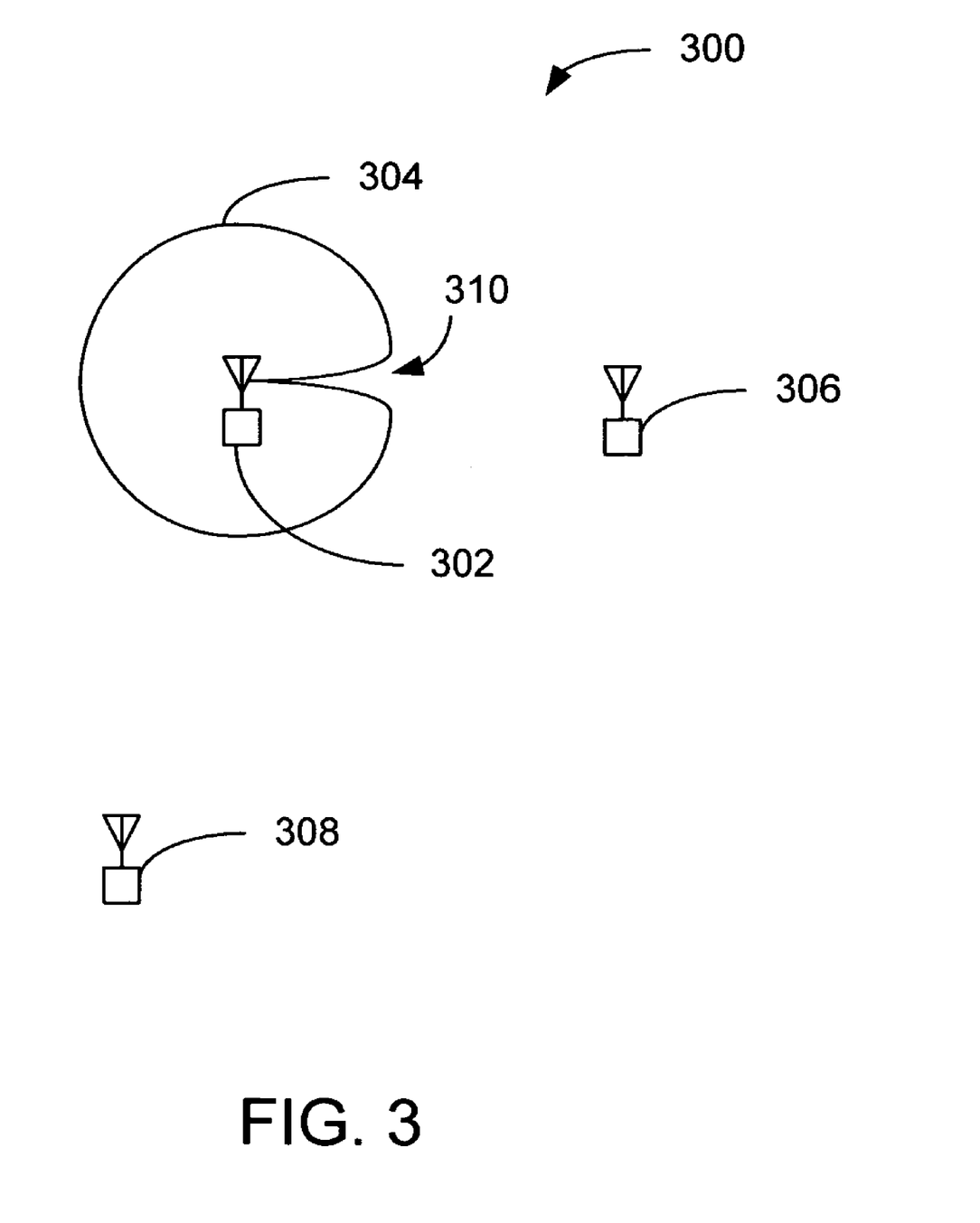
FIG. 3 is a diagram illustrating how the antenna configurations included in the mobile communication device of FIG. 1 can be tuned in response to a jammer in accordance with one embodiment.

FIGS. 2 and 3 illustrate specific examples of how baseband processor can be configured to control the phase and or magnitude of signals being received by controlling signal adjusting network 110. FIG. 2 is diagram that illustrates how fading can affect signals being received by device 100. For example, antenna 101 can be used as the primary antenna and can be coupled with the rest of the receive chain at all times. In one embodiment, antenna 102 can be decoupled, e.g., via a tunable matching network as described below, from the rest of the receive chain. When baseband processor detects that antenna 101 is experiencing a fade, antenna 102 can be coupled with the rest of the receive chain. Because antenna 102 is spatially, and possibly polar, diverse from antenna 101, antenna 102 will likely not be experiencing a fade at the same time as antenna 101. Thus, by combining signals received by antenna 102 with those received by antenna 101, overall reception can be improved when antenna 101 is experiencing a fade. Once antenna 102 is coupled with the rest of the receive chain, the phase and/or magnitude of the signals being received by antenna 102 can be adjusted via signal adjusting network 110 in order to optimize signal reception.

FIG. 2 is a graph illustrating the signal strength over time for signals received by antennas 101 and 102. Graph 204 can represent the signal strength for antenna 101, while graph 206 can represent the signal strength for antenna 102. As can be seen, antenna 102 can be receiving relatively strong signal most of the time. However, at point T1 antenna 101 can experience a fade 208 where the signal strength is drastically reduced. In such instances, the fade can be detected, e.g., as described below, which can then cause antenna 102 to be coupled with the rest of the receive chain.

In one embodiment, primary antenna 101 and secondary antenna 102 can exhibit diversity with regard to space, radiation pattern, and polarity. For example, primary antenna 101 can be vertical stub antenna, while secondary antenna 102 can be a horizontal, internal antenna. Further, a plurality of secondary antenna configurations can be included comprising various polarities, and locations. These secondary antennas can be external or internal depending on the embodiment.

As can be seen in FIG. 2, antenna 102 will likely not be experiencing fading at the same time as antenna 101, e.g., due to the spatial and polar diversity of antenna 102 relative to antenna 101. Thus, antenna 102 may be experiencing the same fade, but the fade will occur on a different time such as T1−ΔT. Thus, by coupling antenna 102 to the rest of the receive chain during the period around which antenna 101 is experiencing fade 208, and then optimizing signal reception via signal adjusting network 110, overall reception performance can be improved.

In certain embodiments, antenna 102 can be coupled to the rest of the receive chain and antenna 101 can be decoupled from the receive chain, e.g., via a tunable matching network as described below, when antenna 101 is experiencing a fade 208. In other embodiments, antenna 102 can be coupled with the rest of the receive chain, when antenna 101 is experiencing a fade 208 and signals from both antennas 101 and 102 can be combined in summer 112.

In other embodiments, signal adjusting network 110 can be used to control the phase of antenna 102 in order to create a null in the antenna pattern for communication device 100. Such a null can be used, for example, to reject a jammer signal and improve overall receiver performance. In other words, by controlling the relative phase of primary antenna 101 and/or secondary antenna 102 the antenna pattern of the two antennas can be modified to reject the jammer signal. The antenna pattern can be modified in such a way as to decrease the ability to receive signals from the direction of the jammer, while allowing signals from other directions to be received normally.

This can be illustrated in conjunction with FIG. 3, which illustrates a communication network 300 in which mobile communication devices 302 and 308 are operating. Mobile communication device 302 can comprise a plurality of antenna configurations and signal adjusting networks such as described in relation to mobile communication device 100. Since mobile communication device 302 and 308 are operating within the same network, they typically will not act as jammers relative to one another. Often, however, jammers such as base stations or mobile communication devices operating in other networks, but in the same area as mobile communication device 302, can act as jammers relative to mobile communication device 302.

As an example, a mobile communication device 306 operating in a different network can be within range of mobile communication device 302. In such instances, transmissions from mobile communication device 306 can act as jammers that will degrade receiver performance for mobile communication device 302. To combat the jamming effect of mobile communication device 306, signal adjusting networks in the receive chain of mobile communication device 302 can be tuned so as to create a null 310 in the antenna pattern 304 of mobile communication device 302. As can be seen, this null 310 can reduce the ability of mobile communication device 302 to receive signals emanating from the direction of mobile communication device 306. Thus, null 310 can reduce the effect of jamming signals generated by mobile communication device 306 and can improve over all reception performance from mobile communication device 302. Thus, baseband processor 122 can be configured to detect when jammers are present and the direction that they are coming from, and then tune signal adjusting network 110 so as to create a null in the direction of the detected jammers.

As mentioned, baseband processor 122 can be configured to monitor the received signals in order to determine when to control the phase and/or magnitude of signals being received by antenna 102. For example, baseband processor can be configured to monitor the signal strength and/or noise level of received signals and the, e.g., determine if a fade is occurring or if a jammer is being received. In one embodiment, baseband processor can be configured to monitor the signal strength and Ec/Io. If baseband processor detects that both the signal strength and Ec/Io are low, then baseband processor 122 can be configured to detect that a fade is occurring. Baseband processor 122 can be configured to then switch antenna 102 into the receive chain, depending on the embodiment, and continue monitoring the received signal quality. Baseband processor 122 can be configured to then adjust the phase and/or magnitude of signals being received by antenna 102 in order to further optimize the signal quality.

It should be noted that in certain instances, switching antenna 102 into the receive chain can actually reduce the received signal quality. In such instances, baseband processor 122 can be configured to decouple, or switch antenna 102 back out of the receive chain.

If baseband processor 122 detects that the signal level is high, but that Ec/Io is low, baseband processor can be configured to detect that jammer is being received. In such instances, baseband processor 122 can be configured to control the phase of signals being received by antenna 102 in order to create a null in the direction of the jammer. This can be an iterative process of controlling the phase and/or magnitude until the signal quality improves enough that no further adjusting is required. For example, a threshold can be used to determine whether the signal quality has improved sufficiently that no further adjusting is required.

The signal strength can be determined based on the Ec/Io measurement. Alternatively, an optional power detector 116 can be included at the output of LNA 114, since it is the power at the output of LNA 114 that is relevant here.

It should be noted that a signal adjusting network can, in certain embodiments, be included for all antennas. In other words, for the example of FIG. 1, an signal adjusting network can also be included for antenna 101.

Figure 5:
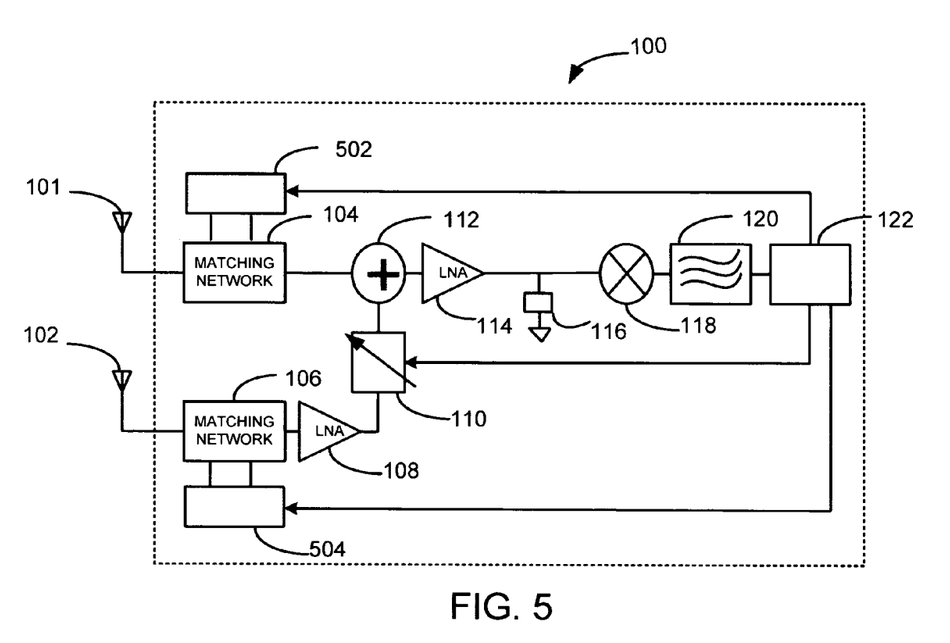
FIG. 5 is a diagram illustrating example mobile communication device comprising a plurality of antenna configurations in accordance with another embodiment

FIG. 5 is a diagram illustrating an example embodiment of a mobile communication device that includes tunable matching networks 104 and 106 and mismatch detectors 502 and 504 in accordance with another embodiment of the systems and methods described herein. Tunable matching networks 104 and 106 can be a Resistor-Inductor-Capacitor (RLC) networks in which, e.g., the capacitive component is adjustable, or tunable. The RLC components can comprise fixed components that can, for example, be switched in and out to adjust the characteristics, e.g., the capacitive characteristics, of the RLC network. Alternatively, these components can comprise Ferroelectric components that can more easily be tuned and that can be made much smaller, reducing cost, board area and complexity.

Mismatch detectors 502 and 504 can be configured to detect when antennas 101 or 102 are not optimally matched to the rest of the receive chain and adjust tunable matching networks 104 and 106 in order to improve the received signal quality. Mismatch detectors 502 and 504 can also be configured to switch antennas 101 and 102, respectively, in and out of the receive chain. In other words, mismatch detectors 502 and 504 can be configured to detune tunable matching networks 104 and 106 so as to effectively decouple antennas 101 and 102 from the rest of the receive chain.

Thus, for example, with reference to the fading scenario of FIG. 2, mismatch detector 504 can start out by detuning antenna 102 so that it is decoupled from the rest of the receive chain. But once baseband processor 122 detects that a fade is occurring, it can control mismatch detector 504 so as to cause antenna 102 to be couple with the rest of the receive chain. This will cause signals from antenna 102 to be received in a manner that can help overcome the fading environment as described above. The tunable matching circuit helps to compensate for the antenna input impedance change due to change in its surrounding (user hand or head, metallic table, for example).

Figure 4:
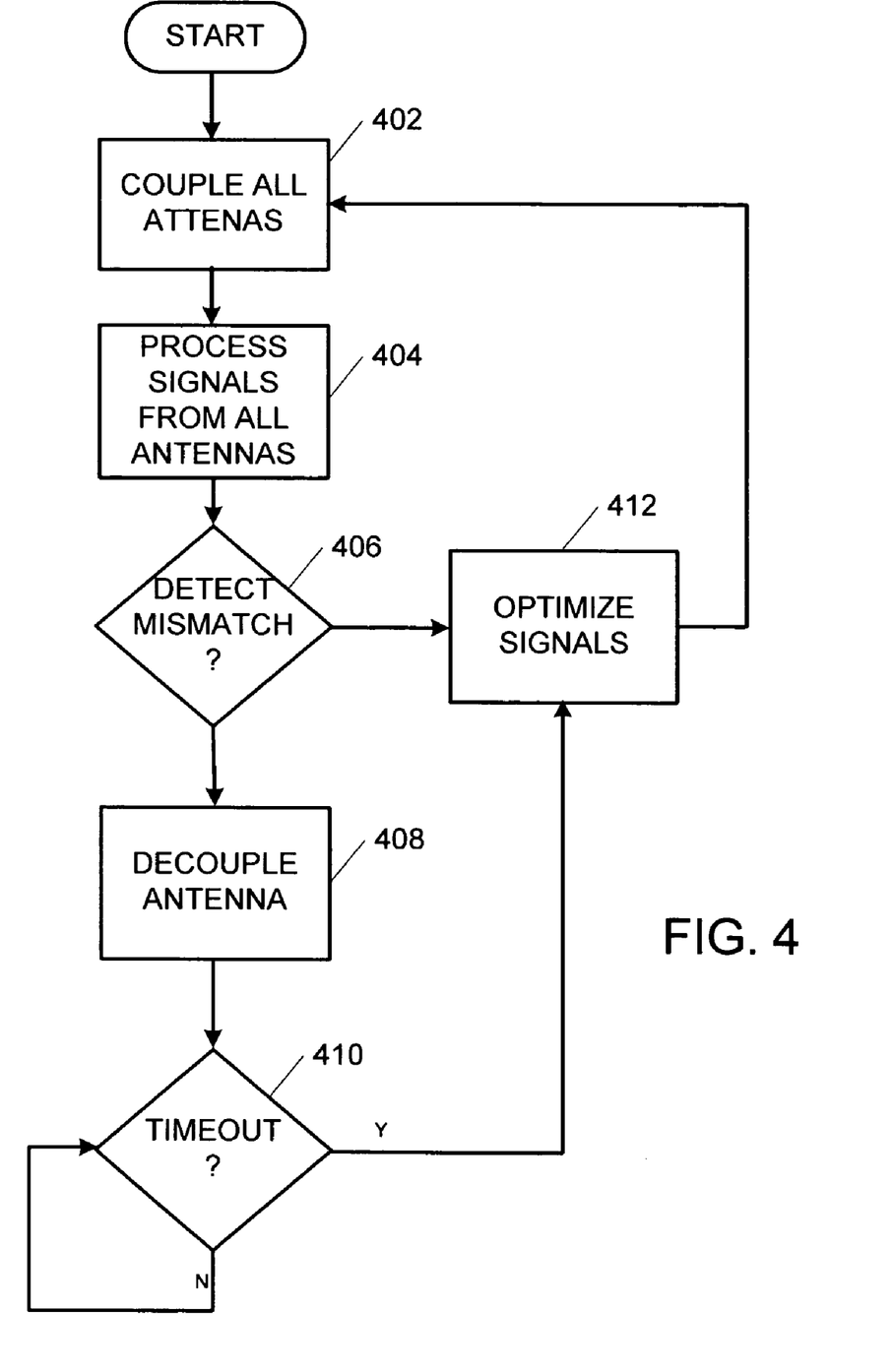
FIG. 4 is a flow chart illustrating an example method for tuning the antenna configurations included in the mobile communication device of FIG. 1 in accordance with one embodiment.

FIG. 4 is a flowchart illustrating an example method for controlling a tunable matching network in a mobile communication device in accordance with one embodiment of the systems and methods described herein. In step 402, all antennas, e.g., antennas 101 and 102, can be coupled to the receive chain. In step 404, signals from all antennas can be processed, e.g., via rake receiver 120. In step 406, a mismatch of one of the antennas can be detected. If no mismatch is detected, then in step 412, signal adjusting networks, such as signal adjusting network 110 can be controlled so as to optimize the signals being received. If a mismatch is detected in step 406, then in step 408, tunable matching networks, such as tunable matching networks 104 and 106, can be tuned so as to effectively decouple the mismatched antenna from the rest of the receive chain.

It should be noted that when an antenna is decoupled from the rest of the receive chain due to a detected mismatch, there should be some mechanism for re-coupling the antenna with the receive chain once the mismatch condition has passed. In one embodiment, a timer can be set once the antenna is decoupled. Thus, in step 410 it can be determined if such a timer has timed out. If it has been determined that the timer has timed out, in step 410, then the antenna can be coupled to the receive chain again, and signals can again be processed from all antennas.

When antenna 102 is coupled to the receive chain, either in step 410, or when a fade is detected as described above, then signal adjusting network can be used to optimize the received signals as described above.

It should be noted that other mechanisms for decoupling an antenna from the receive chain can be implemented in conjunction with the systems and methods described herein. For example, a switch, e.g., controlled by a mismatch detector or baseband processor 122, can be included and configured to switch antenna 102 in and out of the receive chain. In another alternative embodiment, LNA 108 can be turned off such that signals from antenna 102 are not transmitted through LNA 108 to the rest of the receive chain. Further, if LNA 108 is included it can be preferable to shut it down when antenna 102 is decoupled from the receive chain so that it does not continue to draw power from the power supply.

By including a signal adjusting network, and possible tunable matching networks, and the appropriate detection circuitry, receiver performance can be improved in response to a variety of conditions and interference. Further, the approaches described herein can be applied to any number of antennas, or antenna configurations. Further, while certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A mobile communication device, comprising:
    a primary antenna configuration configured to receive signals transmitted to the mobile communication device;
    a secondary antenna configuration configured to receive signals transmitted to the mobile communication device;
    a signal adjusting network coupled with the secondary antenna configuration, the signal adjusting network configured to adjust at least one of the phase and magnitude of signals being received by the secondary antenna configuration;
    a rake receiver configured to receive signals from the primary and secondary antenna configurations;
    a baseband processor coupled with the rake receiver and the signal adjusting network, the baseband processor configured to monitor received signal quality and adjust at least one of the phase and magnitude of signals being received by the secondary antenna configuration by controlling the signal adjusting network based on the monitored received signal quality;
    a tunable matching network coupled with the secondary antenna, the tunable matching network configured to couple and decouple the secondary antenna configuration with the rake receiver; and
    a second tunable matching network coupled with the primary antenna,
    wherein the baseband processor is further configured to detect that a fade is affecting signals received by the primary antenna and to cause the secondary antenna to be coupled with the rake receiver by controlling the tunable matching network, and
    the baseband processor is further configured to cause the second tunable matching network to decouple the primary antenna from the rake receiver when the baseband processor detects that the primary antenna is experiencing a fade.

2. The mobile communication device of claim 1, wherein the primary antenna configuration is spatially diverse from the secondary antenna configuration.

3. The mobile communication device of claim 1, wherein the primary antenna configuration exhibits polar diversity with respect to the secondary antenna configuration.

4. The mobile communication device of claim 1, wherein the primary antenna configuration exhibits radiation pattern diversity with respect to the secondary antenna configuration.

5. The mobile communication device of claim 1, wherein the signal adjusting network comprises variable capacitors comprising at lest one ferroelectric capacitor.

6. The mobile communication device of claim 1, further comprising a first mismatch detector coupled to the primary antenna configuration and a second mismatch detector coupled to the secondary antenna configuration, the primary antenna configuration being effectively decoupled from the rake receiver when a first mismatch is detected by first mismatch detector, the secondary antenna configuration being effectively decoupled from the rake receiver when a second mismatch is detected by second mismatch detector.

* * * * *